US012646518B2

(12) United States Patent
Lokanath et al.

(10) Patent No.: US 12,646,518 B2
(45) Date of Patent: Jun. 2, 2026

(54) METHOD AND SYSTEM FOR CONTEXTUAL DEVICE WAKE-UP IN MULTI-DEVICE MULTI-REALITY ENVIRONMENTS

(71) Applicant: Samsung Electronics Co., Ltd., Suwon-si (KR)

(72) Inventors: Manjunath Belgod Lokanath, Bengaluru (IN); Vishwanath Pethri Kamath, Bengaluru (IN); Rishabh Shukla, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 18/883,463

(22) Filed: Sep. 12, 2024

(65) Prior Publication Data

US 2025/0006195 A1 Jan. 2, 2025

Related U.S. Application Data

(63) Continuation of application No. PCT/KR2024/007274, filed on May 29, 2024.

(30) Foreign Application Priority Data

Jun. 5, 2023 (IN) .............................. 202341038628
Feb. 15, 2024 (IN) .............................. 2023 41038628

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC .............. G10L 15/22; G10L 2015/223; G10L 2015/088; G10L 15/16; G10L 15/08;
(Continued)

(56) References Cited

U.S. PATENT DOCUMENTS 10,026,399 B2 * 7/2018 Gopalan ................. G10L 15/22
10,353,474 B2 7/2019 Sharma et al.
(Continued)

FOREIGN PATENT DOCUMENTS

CN 112507799 A 3/2021
CN 115499261 A 12/2022
(Continued)

OTHER PUBLICATIONS

International Search report and written opinion dated Sep. 19, 2024, issued in International Application No. PCT/KR2024/007274.
(Continued)

*Primary Examiner* — Abdelali Serrou
(74) *Attorney, Agent, or Firm* — Jefferson IP Law, LLP

(57) ABSTRACT

A method for waking up a device among a plurality of devices in in a multi-reality environment is provided. The method includes detecting a voice input from a user, receiving, based on the voice input, a first plurality of wakeup parameters associated with a plurality of real-world devices in the real-world and a second plurality of wakeup parameters associated with a plurality of virtual-world devices in a virtual world, feeding the first plurality of wakeup parameters and the second plurality of wakeup parameters into a pre-trained artificial intelligence (AI)-based model a correlation of one or more of a context of the user, a history a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices, and error information in wake-up of each of the plurality of real-world devices and the plurality of virtual-world devices, predicting, by the pre-trained AI-based model, a target device based
(Continued)

700

Start

Detecting a voice input from a user ~701

Receiving, based on the voice input, a first plurality of wakeup parameters associated with a plurality of real-world devices in the real-world and a second plurality of wakeup parameters associated with a plurality of virtual-world devices in a virtual world ~703

Feeding the first plurality of wakeup parameters and the second plurality of wakeup parameters into including a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices and error information in wake-up of each of the plurality of real-world devices and the plurality of virtual-world devices ~705

Predicting, by the pre-trained AI-based model, a target device based on the first plurality of wakeup parameters, the second plurality of wakeup parameters ~707

Sending a wake-up signal to the target device for turning the target device into a listening state ~709

End on the first plurality of wakeup parameters, the second plurality of wakeup parameters, and sending a wake-up signal to the target device for turning the target device into a listening state.

20 Claims, 10 Drawing Sheets

(58) Field of Classification Search
CPC ....... G10L 15/20; G10L 15/28; G10L 15/285; G10L 15/32; G10L 2015/226; G10L 2015/228; G10L 25/78; G10L 15/02; G10L 15/083; G10L 15/30; G10L 2015/225; G10L 21/0208; G10L 21/0232; G10L 25/30; G10L 25/51; G10L 25/84; G06F 3/167; G06F 3/1454; G06F 2203/0384; G06F 3/04817; G06F 16/435; G06F 16/90332; G06F 3/041; G06F 3/04845; G06F 3/0488; G06F 9/452; G06F 3/038; G06F 3/0481; G06F 3/0604; G06F 3/0656; G06F 3/0673; G06F 3/165; G06F 16/243; G06F 16/245; G06F 16/2477; G06F 16/3329; G06F 3/04883; G06F 40/211; G06F 40/253; G06F 40/30; G06F 21/32; G06F 3/011; G06F 3/017; G06F 3/0482; G06F 3/0484; G06F 3/04886
See application file for complete search history.

(56)                  References Cited

U.S. PATENT DOCUMENTS

| | | | |
|---|---|---|---|
| 11,189,268 B2* | 11/2021 | Park | G10L 15/22 |
| 11,200,897 B2* | 12/2021 | Yi | G10L 15/30 |
| 11,657,800 B2* | 5/2023 | Kim | G10L 15/08 |
| | | | 704/200 |
| 12,051,403 B2* | 7/2024 | Jain | G10L 15/063 |
| 2017/0195505 A1 | 7/2017 | Wexler et al. | |
| 2019/0392834 A1 | 12/2019 | Yi et al. | |
| 2020/0005766 A1 | 1/2020 | Kim | |
| 2020/0090643 A1* | 3/2020 | Shin | G10L 15/063 |
| 2021/0134286 A1* | 5/2021 | Burton | G06F 9/453 |
| 2021/0233537 A1 | 7/2021 | Yang et al. | |
| 2021/0407517 A1* | 12/2021 | Lee | G10L 17/06 |
| 2022/0051677 A1 | 2/2022 | Park et al. | |
| 2022/0165036 A1 | 5/2022 | Daley et al. | |
| 2022/0254341 A1 | 8/2022 | Naganna et al. | |
| 2023/0126305 A1 | 4/2023 | Kim et al. | |

FOREIGN PATENT DOCUMENTS

| | | |
|---|---|---|
| CN | 115691485 A | 2/2023 |
| KR | 10-2019-0075870 A | 7/2019 |
| WO | 2016/085776 A1 | 6/2016 |
| WO | 2022/196896 A1 | 9/2022 |

OTHER PUBLICATIONS

European Search Report dated Feb. 13, 2026, issued in European Application No. 24819528.1.

* cited by examiner

FIG. 4
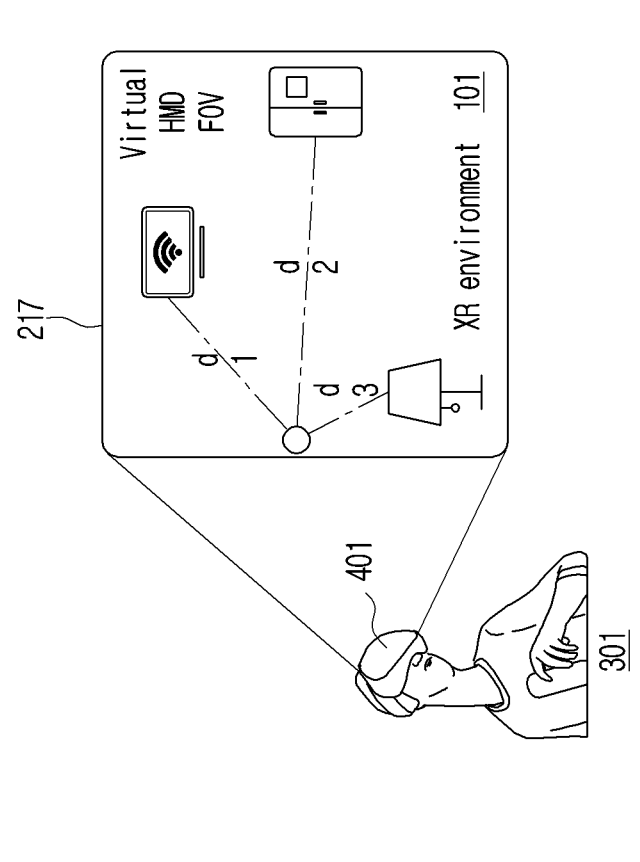
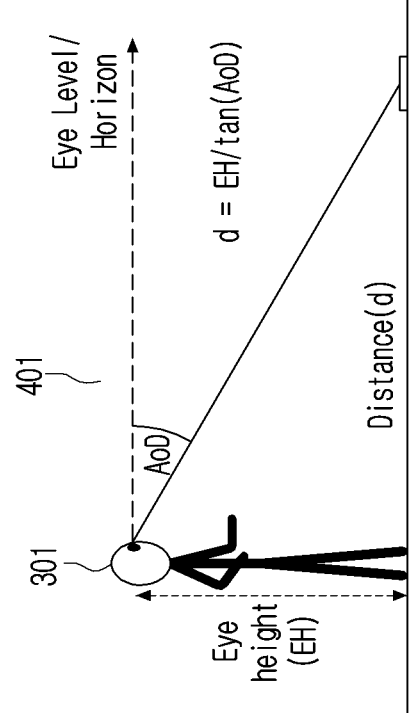

| SNR Info |
| NonSpeech inputs |
| User Direction |
| User Distance |
| Time Factor |
| Voice Analyser |
| egocentric Distance |
| VR Normalized SNR, Distance, Direction |

Input Samples 501

Training Phase

FIG. 7A

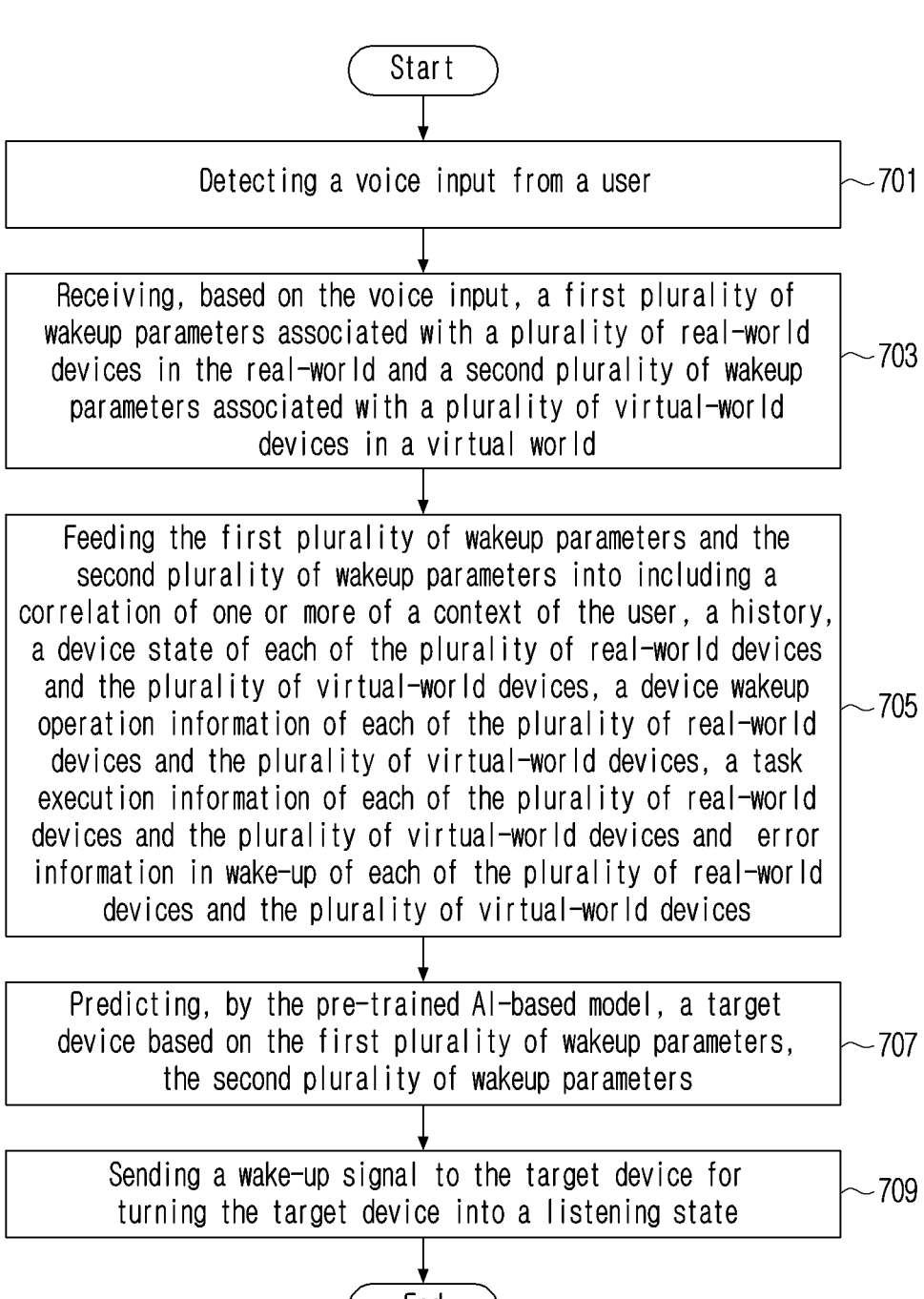

700

Start

Detecting a voice input from a user ~701

Receiving, based on the voice input, a first plurality of wakeup parameters associated with a plurality of real-world devices in the real-world and a second plurality of wakeup parameters associated with a plurality of virtual-world devices in a virtual world ~703

Feeding the first plurality of wakeup parameters and the second plurality of wakeup parameters into including a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices and error information in wake-up of each of the plurality of real-world devices and the plurality of virtual-world devices ~705

Predicting, by the pre-trained AI-based model, a target device based on the first plurality of wakeup parameters, the second plurality of wakeup parameters ~707

Sending a wake-up signal to the target device for turning the target device into a listening state ~709

End

FIG. 7B

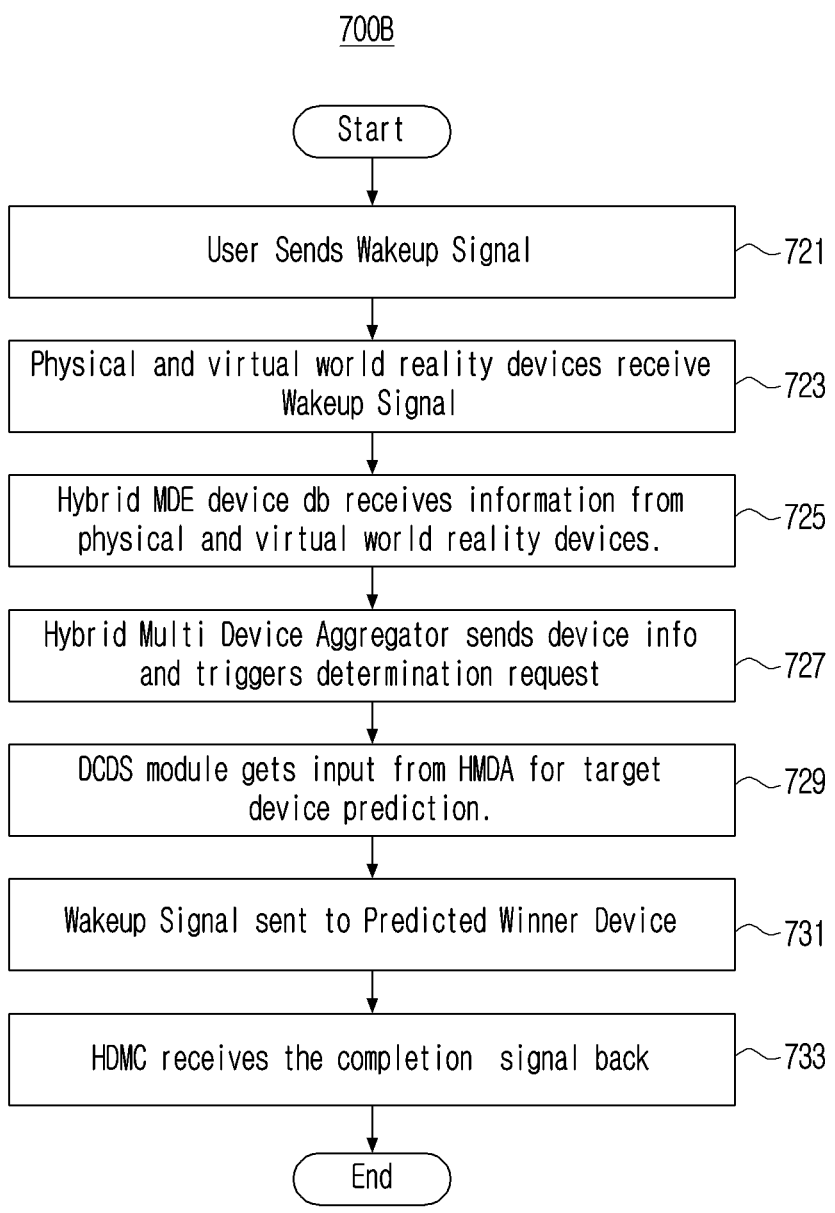

700B

Start

User Sends Wakeup Signal ~721

Physical and virtual world reality devices receive Wakeup Signal ~723

Hybrid MDE device db receives information from physical and virtual world reality devices. ~725

Hybrid Multi Device Aggregator sends device info and triggers determination request ~727

DCDS module gets input from HMDA for target device prediction. ~729

Wakeup Signal sent to Predicted Winner Device ~731

HDMC receives the completion  signal back ~733

End

METHOD AND SYSTEM FOR CONTEXTUAL DEVICE WAKE-UP IN MULTI-DEVICE MULTI-REALITY ENVIRONMENTS

CROSS-REFERENCE TO RELATED APPLICATION(S)

This application is a continuation application, claiming priority under 35 U.S.C. § 365(c), of an International application No. PCT/KR2024/007274, filed on, May 29, 2024, which claims priority under 35 U.S.C. § 119 to Indian Provisional Patent Application No. 202341038628, filed on Jun. 5, 2023, in the Indian Intellectual Property Office, of an Indian Complete patent application No. 202341038628, filed on Feb. 15, 2024, in the Indian Intellectual Property Office, the disclosures of which are incorporated herein by reference in their entireties.

BACKGROUND FIELD

The disclosure relates to multi-device-multi reality environments. More particularly, the disclosure relates to contextual device wake-up in the multi-device-multi reality environments.

DESCRIPTION OF THE RELATED ART

Recently, as virtual reality (VR), augmented reality (AR), and mixed reality (XR) technologies advanced and became more accessible, Multi-Device Multi-Reality environments began to gain popularity. The Multi-Device Multi-Reality environment represents a dynamic landscape where users engage with a plurality of devices across both physical and virtual realms. In the Multi-Device Multi-Reality environment, the user can seamlessly transition between tangible devices in the physical world, such as smartphones, tablets, and smart home appliances, and VR smart devices in the virtual world.

In a multi-device environment spanning various realities, there are currently no established methods for initiating device wakeups.

FIG. 1 illustrates an example of a Multi-Device Multi-Reality environment implemented according to the related art. FIG. 1 depicts the Multi-Device Multi-Reality environment 100 where the user is communicating with multiple devices present in the XR environment 101 and in the physical environment 103.

Referring to FIG. 1, when the user utters a wake command for example "Hi xxx" to wake up the voice assistant, then the device in the physical room may wake up based on static parameters. In the example scenario, when the user utters the wake command for example "Hi xxx", a television (TV) 105 of the physical environment 103 gets into a listening stage. According to another example scenario, consider that the user utters the command for example "What's the time" to the voice assistant, but the devices at both the world get active. For example, both the TV 105 of the physical world and the virtual TV 107 answer to the user command. Accordingly, the devices existing only within the virtual environment do not actively participate in the process of differentiating or distinguishing real-world stimuli in order to wake up other devices.

In the current scenario, as explained, multiple devices turn on to wake-up mode and get into the listening mode. With the user further delivering the voice command, the response can be delivered from multiple devices and leads to a bad user experience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide contextual device wake-up in the multi-device-multi reality environments.

Additional aspects will be set forth in part in the description which follows and, in part, will be apparent from the description, or may be learned by practice of the presented embodiments.

In accordance with an aspect of the disclosure, a method for waking up a device among a plurality of devices in a multi-reality environment is provided. The method includes detecting a voice input from a user, receiving, based on the voice input, a first plurality of wakeup parameters associated with a plurality of real-world devices in the real world and a second plurality of wakeup parameters associated with a plurality of virtual-world devices in a virtual world, feeding the first plurality of wakeup parameters and the second plurality of wakeup parameters into a pre-trained artificial intelligence (AI)-based model including a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices and error information in wake-up of each of the plurality of real-world devices and the plurality of virtual-world devices, predicting, by the pre-trained AI-based model, a target device based on the first plurality of wakeup parameters, the second plurality of wakeup parameters, and sending a wake-up signal to the target device for turning the target device into a listening state.

In accordance with another aspect of the disclosure, an apparatus for waking up a device among a plurality of devices in a multi-reality environment is provided. The apparatus includes memory storing one or more computer programs, and one or more processors communicatively coupled to the memory, wherein the one or more computer programs include computer-executable instructions that, when executed by the one or more processors, cause the apparatus to detect a voice input from a user, receive, based on the voice input, a first plurality of wakeup parameters associated with a plurality of real-world devices in the real world and a second plurality of wakeup parameters associated with a plurality of virtual-world devices in a virtual world, feed the first plurality of wakeup parameters and the second plurality of wakeup parameters into a pre-trained artificial intelligence (AI)-based model including a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices and error information in wake-up of each of the plurality of real-world devices and the plurality of virtual-world devices, predict, by the pre-trained AI-based model, a target device based on the first plurality of wakeup parameters, the second plurality of wakeup parameters, and send a wake-up signal to the target device for turning the target device into a listening state.

In accordance with another aspect of the disclosure, one or more non-transitory computer-readable storage media storing one or more computer programs including computer-executable instructions that, when executed by one or more processors of an apparatus, cause the apparatus to perform operations are provided. The operations include detecting a voice input from a user, receiving, based on the voice input, a first plurality of wakeup parameters associated with a plurality of real-world devices in the real-world and a second plurality of wakeup parameters associated with a plurality of virtual-world devices in a virtual world, feeding the first plurality of wakeup parameters and the second plurality of wakeup parameters into a pre-trained artificial intelligence (AI)-based model including a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices, and error information in wake-up of each of the plurality of real-world devices and the plurality of virtual-world devices, predicting, by the pre-trained AI-based model, a target device based on the first plurality of wakeup parameters, the second plurality of wakeup parameters, and sending a wake-up signal to the target device for turning the target device into a listening state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an example of calculating an egocentric distance between a user and each of a plurality of virtual world devices, according to an embodiment of the disclosure;

FIG. 7A illustrates a flowchart for waking up a device among a plurality of devices in a multi-reality environment, according to an embodiment of the disclosure;

4

Figure 8:
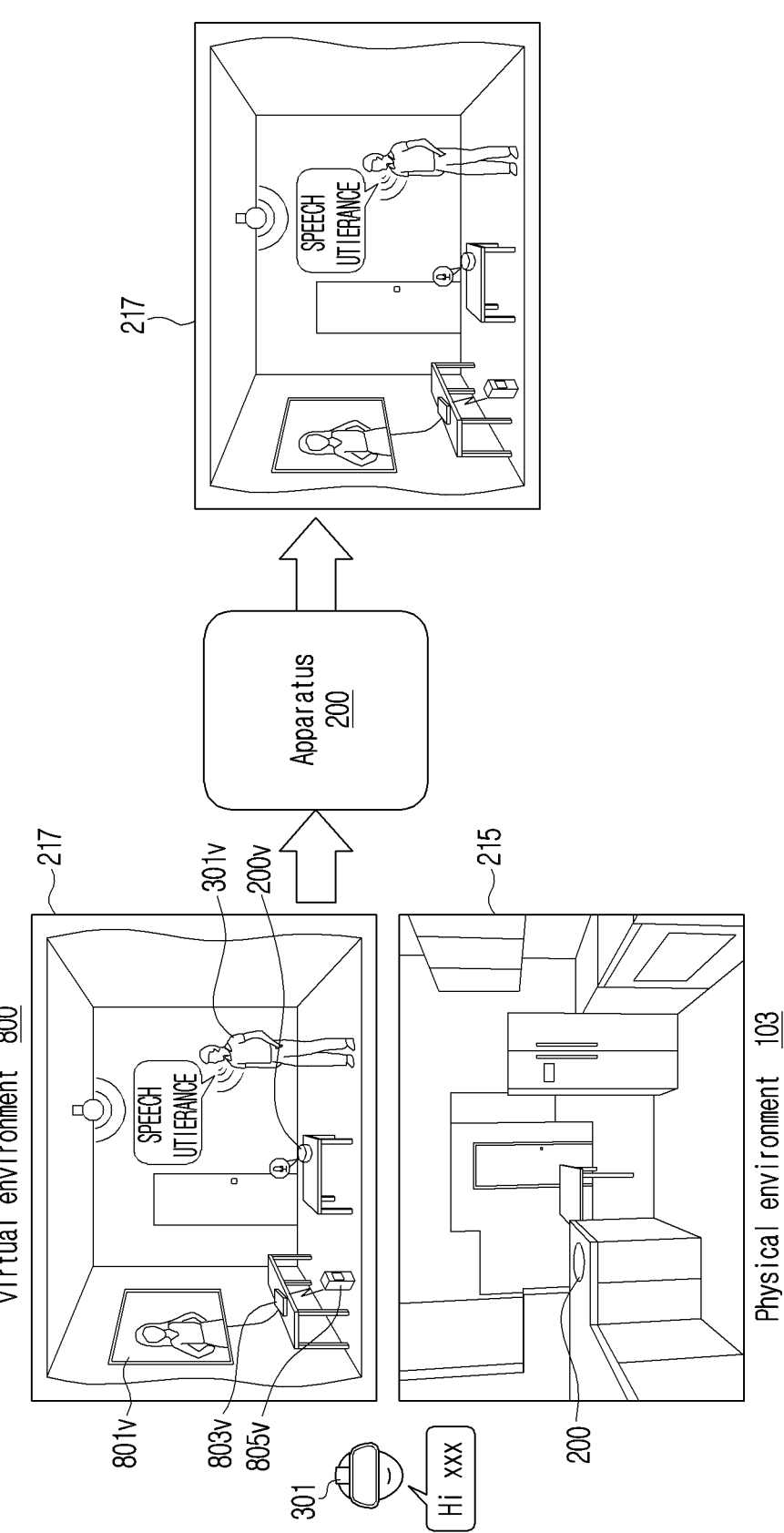
Figure 9:
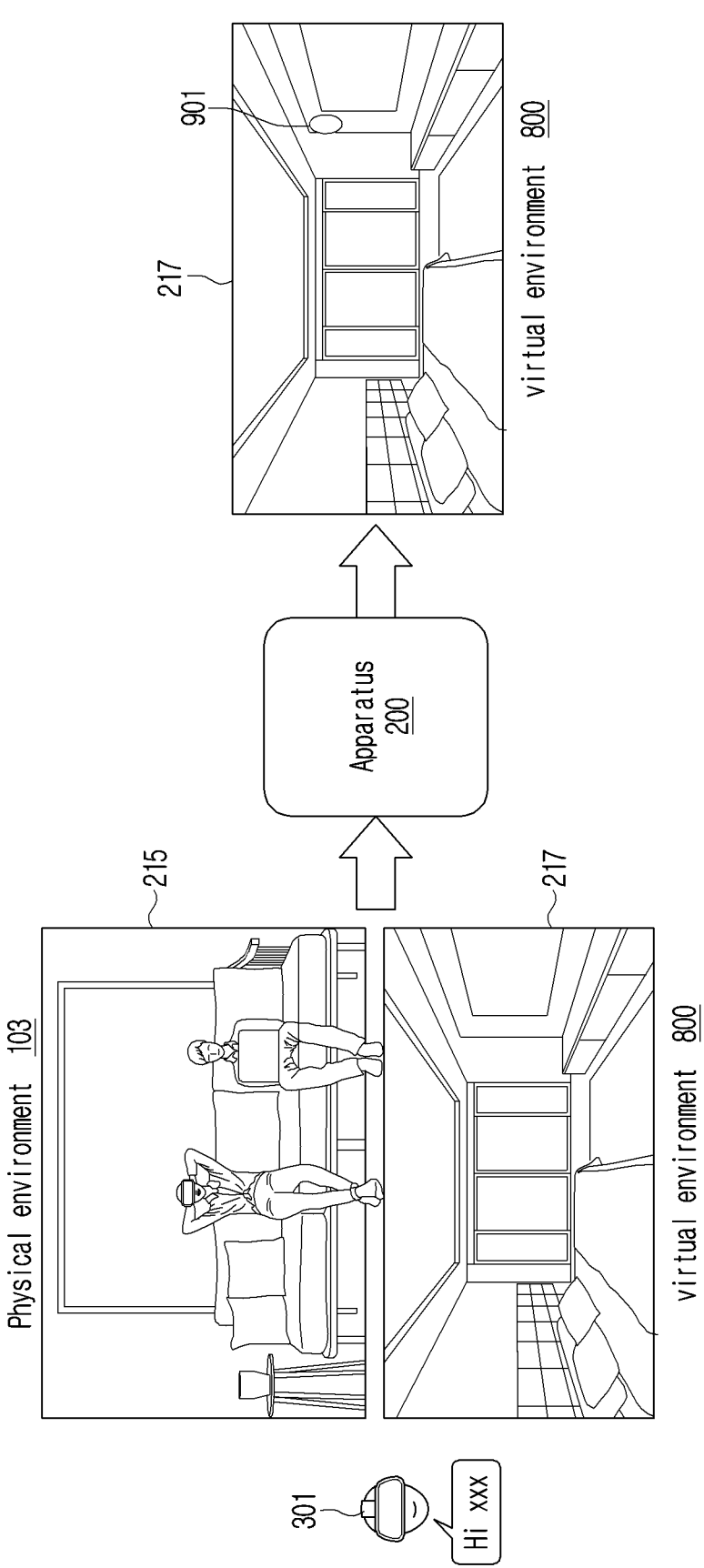

FIG. 7B illustrates an operational flow for waking up a device in a multi-reality environment, according to an embodiment of the disclosure;

FIG. 8 illustrates a use case scenario for waking up a device among a plurality of devices in a multi-reality environment, according to an embodiment of the disclosure; and FIG. 9 illustrates another case scenario for waking up a device among a plurality of devices in a multi-reality environment, according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments, to one embodiment or to several embodiments or to all embodiments. The term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

Any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." The use of the terms "one or more" or "at least one" feature or element does NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art. The reference numerals are kept same all over for the similar components, entities, and environments throughout the disclosure for ease of understanding.

Various embodiments of the disclosure will be described below in detail with reference to the accompanying drawings.

According to one embodiment, the disclosure provides an apparatus implemented with a method for waking up a device among a plurality of devices in a multi-device multi-reality environment (hereinafter referred to as multi-reality environment). According to another embodiment, in a multi-device multi-reality environment, the process involves waking up the most appropriate device from a list of candidate devices that are predicted by a pre-trained AI-based model. According to an embodiment, a wake-up signal is sent to the most appropriate device for turning the most appropriate device into a listening state. The AI-based model is trained based on a plurality of parameters associated with the user and the plurality of devices in the multi-device multi-reality environment.

A detailed methodology is explained in the following paragraphs of the disclosure.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
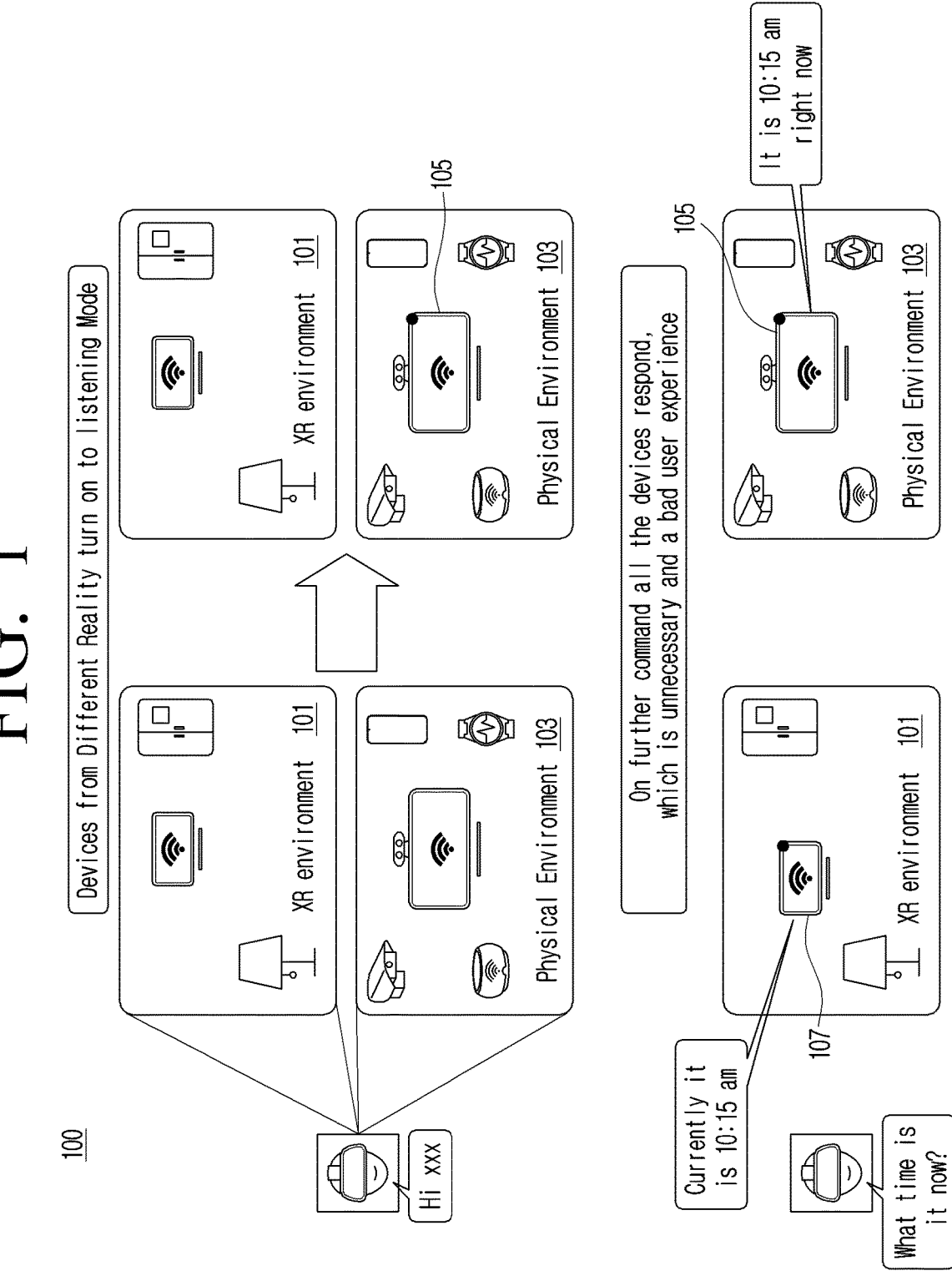
FIG. 1 illustrates an example of a Multi-Device Multi-Reality environment implemented according to the related art.
Figure 2:
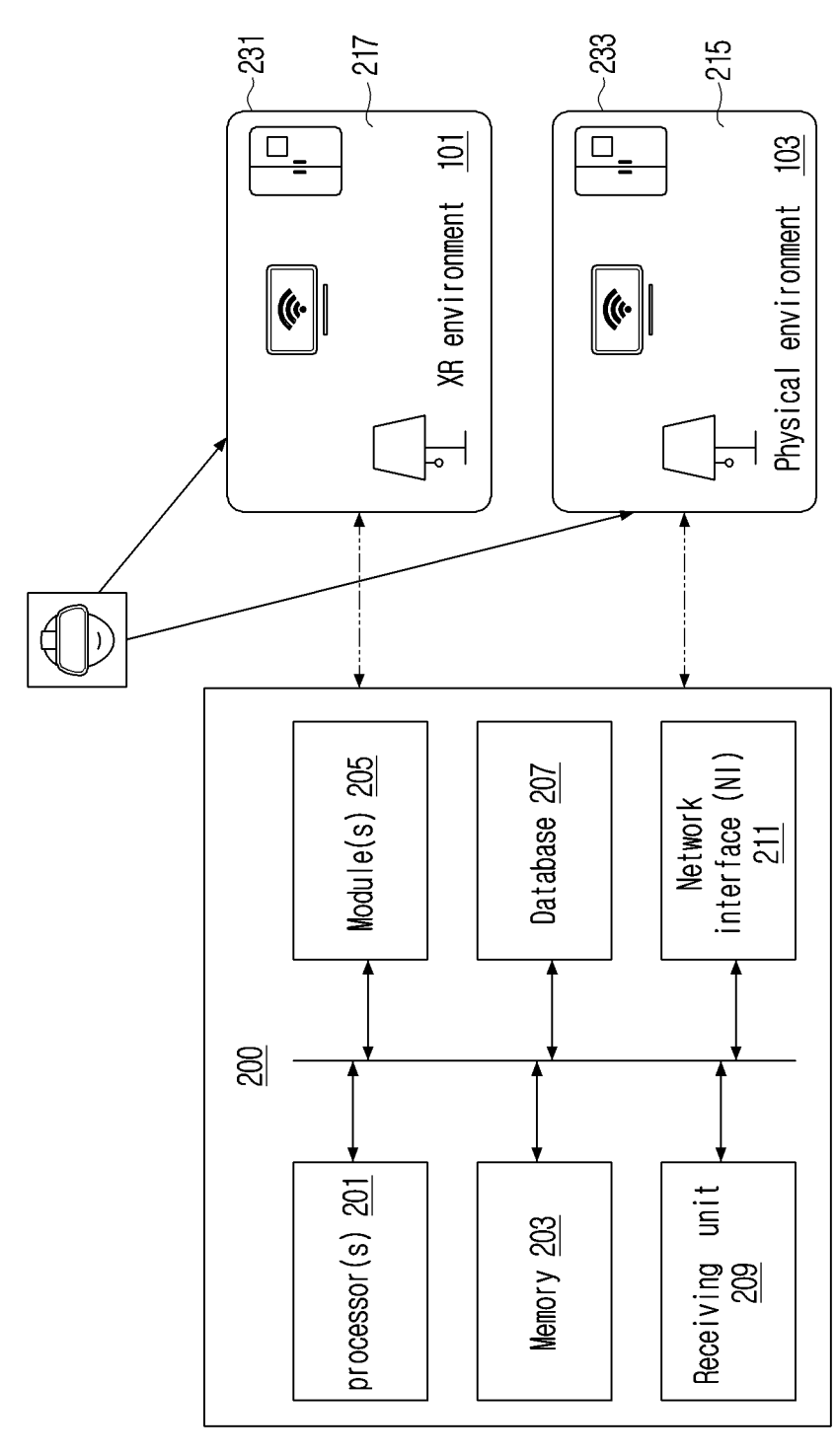
FIG. 2 illustrates a general architecture of an apparatus for waking up a device in a multi-reality environment, according to an embodiment of the disclosure.

FIG. 2 illustrates a general architecture of an apparatus for waking up a device in a multi-reality environment, according to an embodiment of the disclosure.

FIG. 2 describes various components of apparatus 200 for waking up a device in the multi-reality environment. In a non-limiting example, the apparatus 200 includes electronic devices such as a central hub, a smart monitoring system, a voice assistant system, and a head-mounted device (HMD). According to various embodiments, the HMD may act as the central hub which enables seamless communication between physical world devices and virtual world devices. According to some embodiments, the apparatus 200 may be an MDW server that acts as the central hub and enables seamless communication between the physical world devices and the virtual world devices. In an embodiment, the physical world devices are depicted in block 233, and the virtual world devices are depicted in block 231. The physical world devices may be collectively referred to as 215 and the virtual world devices may be collectively referred to as 217. In a non-limiting example, the physical world devices with voice-enabled services that may include smart home devices, Internet of Things (IoT) enabled devices, voice assistants, and the like. Further, in a yet non-limiting example, the virtual world devices may include a digital representation of the physical world devices.

According to an embodiment, an apparatus 200 includes a processor(s) 201, memory 203, a module(s) 205, a database 207, a receiving unit 209, and a network interface (NI) 211 coupled with each other.

For example, the processor 201 may be a single processing unit or a number of units, all of which could include multiple computing units. The processor 201 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 201 is configured to fetch and execute computer-readable instructions and data stored in the memory 203.

The memory 203 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The module(s) 205 may include a program, a subroutine, a portion of a program, a software component, or a hardware component capable of performing a stated task or function. As used herein, the module(s) 205 may be implemented on a hardware component such as a server independently of other modules, or a module can exist with other modules on the same server, or within the same program. The module(s) 205 may be implemented on a hardware component such as processor one or more microprocessors, microcomputers, microcontrollers, digital signal processors, central processing units, state machines, logic circuitries, and/or any devices that manipulate signals based on operational instructions. The module(s) 205, when executed by the processor(s) 201 may be configured to perform any of the described functionalities of the module(s) 205. The various components of module(s) 205 will be explained with reference to FIG. 3 in the later sections.

As another example, the database 207 may be implemented with integrated hardware and software. The hardware may include a hardware disk controller with programmable search capabilities or a software system running on general-purpose hardware. The examples of the database 207 are, but are not limited to, in-memory databases, cloud databases, distributed databases, embedded databases, and the like. The database 207, amongst other things, serves as a repository for storing data processed, received, and generated by one or more of the processors, and the modules/engines/units.

The module(s) 205 may be implemented using one or more AI modules that may include a plurality of neural network layers. Examples of neural networks include but are not limited to, Convolutional Neural Network (CNN), Deep Neural Network (DNN), Recurrent Neural Network (RNN), and Restricted Boltzmann Machine (RBM). According to other embodiments, the module(s) 205 may be implemented using one or more generative AI modules that may include Variational Autoencoders (VAEs), Generative Adversarial Networks (GANs), flow-based generative model, auto-regressive models, and the like. Further, 'learning' may be referred to in the disclosure as a method for training a predetermined target device (for example, a robot) using a plurality of learning data to cause, allow, or control the target device to make a determination or prediction. Examples of learning techniques include but are not limited to supervised learning, unsupervised learning, semi-supervised learning, or reinforcement learning. At least one of a plurality of CNN, DNN, RNN, RMB, VAES, GANs, flow-based generative models, auto-regressive models, and the like may be implemented to thereby achieve execution of the present subject matter's mechanism through an AI model or generative AI models. A function associated with an AI module or the generative AI models may be performed through the non-volatile memory, the volatile memory, and the processor. The processor may include one or a plurality of processors. One or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors or neural processors control the processing of the input data in accordance with a predefined operating rule or artificial intelligence (AI) model or generative AI models stored in the non-volatile memory and the volatile memory. The predefined operating rule or artificial intelligence model is provided through training or learning.

For example, the receiving unit 209 receives a command from the user. As a further example, the NI unit 211 establishes a network connection with a network like a home network, a public network, a private network, a cloud server, and the like for communication purposes.

Figure 3:
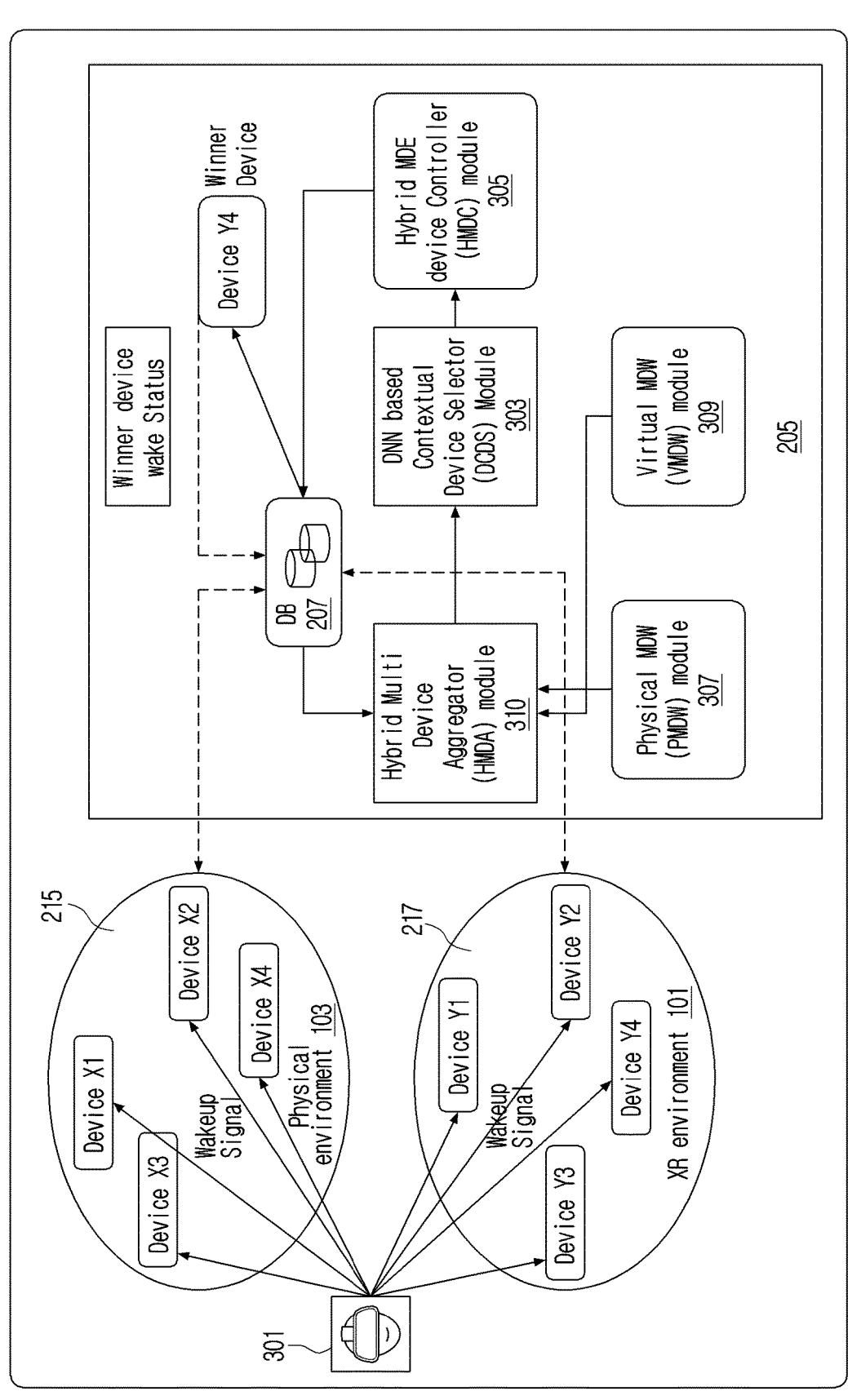
FIG. 3 illustrates various components of modules of FIG. 2, according to an embodiment of the disclosure.

FIG. 3 illustrates various components of modules of FIG. 2, according to an embodiment of the disclosure.

Referring to FIG. 3, module(s) 205 of an apparatus 200 includes a Hybrid Multi-Device Aggregator module (HMDA) 301, a DNN-based Contextual Device Selector (DCDS) Module 303, a Hybrid MDE device Controller (HMDC) module 305, a Physical MDW (PMDW) module 307, and a Virtual MDW (VMDW) module 309.

The forthcoming paragraphs will describe a brief description and work of each of the module(s) 305. The detailed working of each of the components of modules of FIG. 2 will be explained in the forthcoming paragraphs through FIGS. 2 to 6. Further, the reference numerals were kept the same for the similar components for case of understanding.

In an embodiment, the PMDW module 307 is in communication with all the physical world devices 215 in the physical environment 103. The PMDW module 307 takes the physical world devices 215 into consideration as candidates for selecting possible target devices for waking up based on the voice input command received from the user. The target device further processes the command. According to another embodiment, the command may be provided by the user or the apparatus 200. According to yet another embodiment, the PMDW module 307 obtains a first plurality of wakeup parameters for each of the physical world devices 215 based on which the candidates are considered for waking up. In a non-limiting example, the first plurality of wakeup parameters comprises at least one of a signal-noiseratio (SNR) value of each of the physical world devices 215, user's environmental information, a current state of each of the physical world devices 215, a first device status of each of the physical world devices 215, a first device context of each of the physical world devices 215, a direction of the voice input of the user, a distance of the user from each of the physical world devices 215, user's location information, a voice profile information, user profile information, time information related to the usage of the each of the physical world devices 215. The first plurality of wakeup parameters is given to the HMDA module 310 in standard format for further processing.

According to one embodiment, the VMDW module 309 is in communication with all the virtual world devices 217 in the virtual environment 101. The virtual world devices 217 might be completely in a Metaverse or in a mixed reality where the virtual world devices 217 are the digital replica of physical world devices 217 in the respective scene. The VMDW module 309 takes the virtual world devices 217 into consideration as candidates for selecting possible target devices for waking up based on the voice input command received from the user. The target device further processes the command. The command may be provided by the user or the apparatus 200. According to another embodiment, the VMDW module 309 obtains a second plurality of wakeup parameters for each of the virtual world devices 217 based on which the candidates are considered for waking up. In a non-limiting example, the second plurality of wakeup parameters comprises at least one of a second device state of each of the plurality of virtual world devices 217, a second device context of each of the plurality of virtual world devices 217, an egocentric distance between the user and each of the plurality of virtual world devices 217, user profile information, time information related to the usage of the each of the plurality of virtual world devices 217, or a normalized signal to noise ratio (SNR) value of each of the plurality of virtual world devices 217. The second plurality of wakeup parameters is given to the HMDA module 310 in standard format for further processing.

FIG. 4 illustrates an example of calculating an egocentric distance between a user and each of a plurality of virtual world devices 217, according to an embodiment of the disclosure.

The distance of each of the virtual world devices in a virtual space in a virtual world (here an XR environment 101) could be perceived with egocentric distance. The egocentric distance is a measure of the distance of an object from the observer (i.e. a user 301). According to an example scenario, the egocentric distance would be the distance between an HMD device 401 and a virtual world devices 217 in the XR environment 101. In general, the egocentric distance can be measured using multiple methods like depth perception of the scene and the like. The egocentric distance 'd' is given by Equation 1 below.

$$d = EH/\tan(AoD) \qquad \text{Equation 1}$$

(Where EH is eye height and AoD is the angle of distance)

The HMDA module 310 takes the inputs from the PMDW module 307 and the VMDW module 309. In particular, the HMDA module 310 receives the first wakeup parameters and the second plurality of wakeup parameters. According to an embodiment, the HMDA module 310 pre-processes the first wakeup parameters and the second plurality of wakeup parameters by performing a plurality of operations. The plurality of operations may include multi-reality feature normalization such as attribute selection, normalization between physical world devices 215 and virtual world devices 217, parameter identification, and softset techniques.

According to another embodiment, the DCDS module 303 is implemented with a pre-trained AI-based model. According to an example embodiment, a Deep Neural Network (DNN)-based AI model is used as the pre-trained AI-based model.

Figure 5:
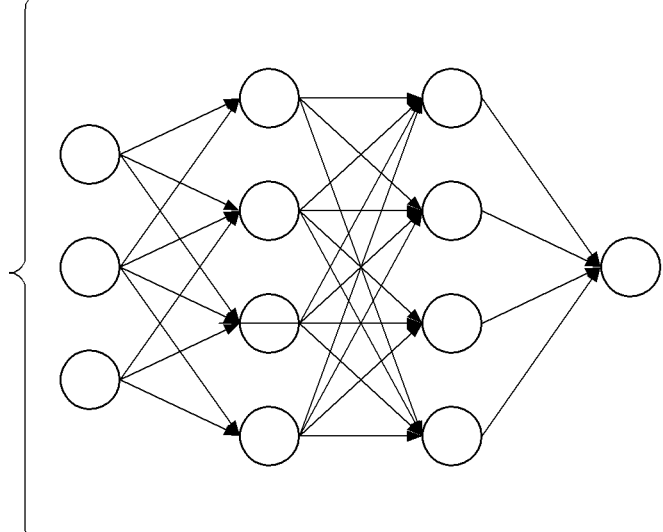
FIG. 5 illustrates an example training phase of a pre-trained AI-based model, according to an embodiment of the disclosure.

FIG. 5 illustrates an example training phase of the pre-trained AI-based model, according to an embodiment of the disclosure.

Referring to FIG. 5, according to an embodiment, the pre-trained AI-based model is trained over various input samples 501. The input samples 501 consists of different scenarios of device selection. Considerations for the physical world and the virtual world scenarios are given as input samples for the pre-trained AI-based model for training. An example of the input samples 501 is given in Tables 1A to 1C. In an embodiment, the input samples may include one or more of a context of the user, a history, a device state of each of the plurality of physical world devices 215 and the plurality of virtual world devices 217, the device wakeup operation information of each of the plurality of physical world devices 215 and the plurality of virtual world devices 217, the task execution information of each of the plurality of physical world devices 215 and the plurality of virtual world devices 217 and the error information in wake-up of each of the plurality of the physical world devices 215 and the plurality of virtual-world devices 217. As the pre-trained AI-based model trains on the given input samples, the pre-trained AI-based model includes a correlation between the one or more of the context of the user, the history, the device state of each of the plurality of physical world devices 215 and the plurality of virtual world devices 217, the device wakeup operation information of each of the plurality of physical world devices 215 and the plurality of virtual world devices 217, the task execution information of each of the plurality of physical world devices 215 and the plurality of virtual world devices 217 and the error information in wake-up of each of the plurality of the physical world devices 215 and the plurality of virtual world devices 217. This correlation information is used in the inference stage for predicting a target device.

Figure 6:
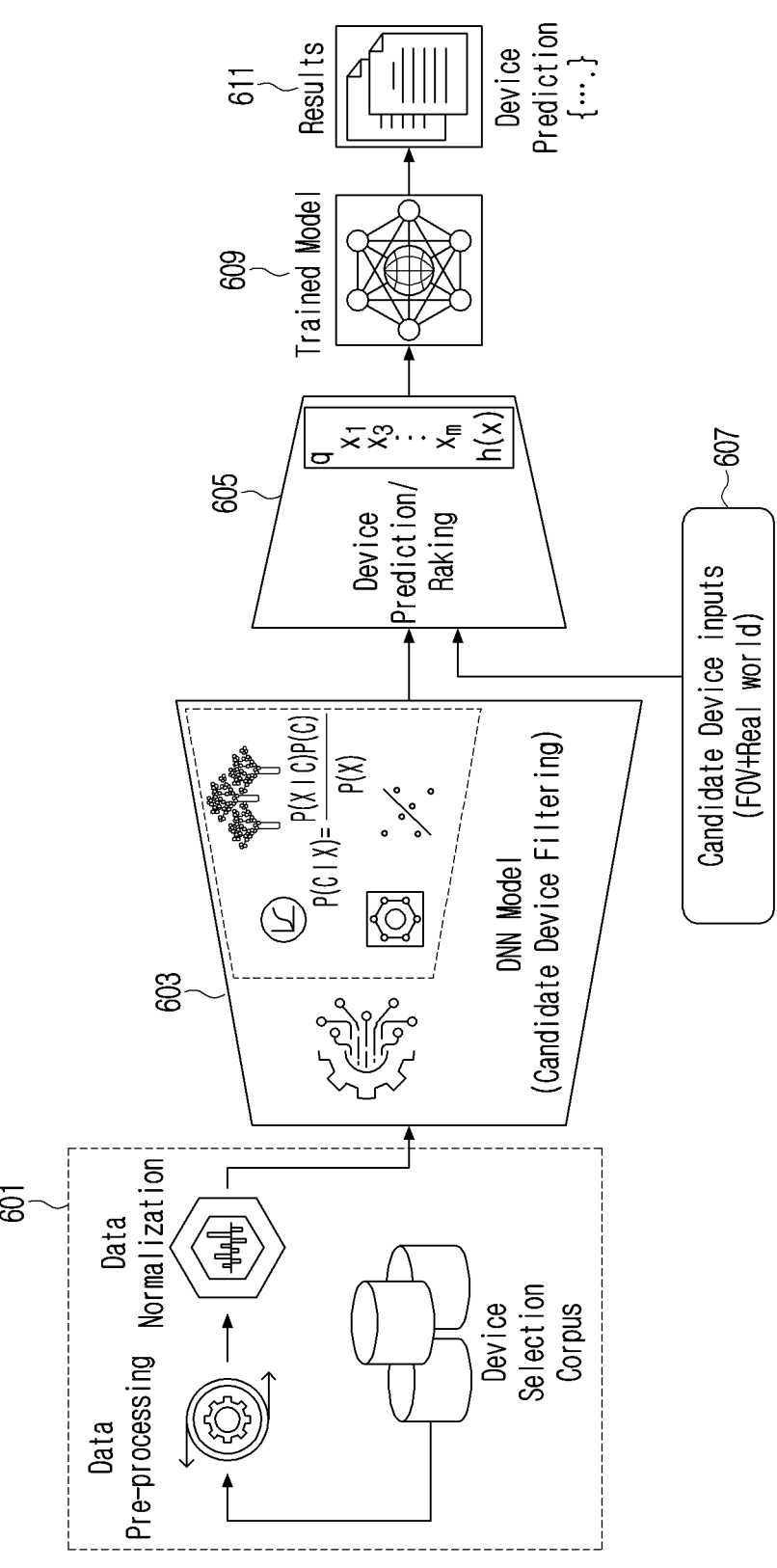
FIG. 6 illustrates an operation flow of a Deep Neural Network-based Contextual Device Selector (DCDS) module 303, according to an embodiment of the disclosure.

FIG. 6 illustrates an operation flow of a DCDS module 303, according to an embodiment of the disclosure.

Referring to FIG. 6, according to an embodiment, at block 601, an HMDA module 310 performs data pre-processing, and data normalization of the first plurality of wakeup parameters and the normalized second plurality of wakeup parameters before the data points are fed to the Deep Neural Network (DNN)-based AI model. The normalized first plurality of wakeup parameters and the normalized second plurality of wakeup parameters, which are obtained from the HMDA module 310, are fed into the Deep Neural Network (DNN)-based AI model. Further, the DCDS module 303, at block 603, predicts a list of candidate devices, from the physical world devices 215 and the virtual-world devices 217.

TABLE 1

| VR Devices | Real World Devices | SNR Value | Device State |
|---|---|---|---|
| {device1:VRHallTV, device2:VRHallSpeaker, device3:VRHallRefrigerator} | {device1:RWBedTV, device2:RWBedLamp, device3:Mobile} | [VR:{device1:80, device2: 80, device3:80}, RealWorld:{device1:50, device2:80, device3:30}] | [VR:{device1:Active, device2: Idle, device3:Idle}, RealWorld:{device1:Active, device2:Active, device3:Idle}] |
| {device1:VRHallTV, device2:VRHallSpeaker, device3:VRHallTableLamp} | {device1:Mobile, device2:RWHallSpeaker} | [VR:{device1:30, device2:30, device3:30}, RealWorld:{device1:20, device2:80}] | [VR:{device1:Active, device2: Idle, device3:error} Realworld:{device1:Idle, device2:Idle}] |
| {device1:VRBedTV, device2:VRBedSpeaker, device3:VRBedTableLamp} | {device1:RWHallTV, device2:RWHallAC, device3:Mobile} | [VR:{device1:40, device2: 40, device3:40}, RealWorld:{device1:30, device2:40, device3:10}] | [VR:{device1:idle, device2: Idle, device3:Active}, RealWorld:{device1:Active, device2:Active, device3:Idle}] |

TABLE 2

| Context | User Present Location | User Direction |
|---|---|---|
| [VR:{device1:{acoustics:"Silent", Time:Afternoon, commendExecutionHistory}, device2: :{acoustics:"noisy", Time:Night, commandExecutionHistory}, device3::(acoustics:"Silent", Time:Morning, commandExecutionHistory}}, RealWorld:{device1::{acoustics:"Silent", Time:Evening, commandExecutionHistory}, device2::{acoustics:"Silent", Time:Afternoon, commandExecutionHistory}, device3::{acoustics:"Silent", Time:Afternoon, commandExecutionHistory}} | {userLoc:{Realworld:"R WBedroom1", VR:" VRLivingRoom"} | {VR:{device1: "VRHallTV"}, Realworld: {device1: "None"} |
| [VR:{device1::{acoustics:"Silent", Time:Afternoon, commandExecutionHistory}, device2:{acoustics:"Silent", Time:Afternoon, commandExecutionHistory}, device3: {acoustics:"Silent", Time:Night, commandExecutionHistory}}, RealWorld:{device1:{acoustics:"Silent", Time:Afternoon, commandExecutionHistory}, | {userLoc:{Realworld:"R WlivingRoom", VR:"VRLivingRoom"} | {VR: {device1: "VRHallSpeaker"}, Realworld: {device1: "RWHallSpeaker"} |

TABLE 2-continued

| Context | User Present Location | User Direction |
|---|---|---|
| device2:{acoustics:"Silent", Time:Morning, commandExecutionHistory}}] [VR:{device1:{acoustics:"Silent", Time:Night, commandExecutionHistory}, device2: {acoustics:"moderate", Time:Night, commandExecutionHistory}, device3: {acoustics:"moderate", Time:Night, commandExecutionHistory}}, Realworld:{device1: {acoustics:"Silent", Time:Evening, commandExecutionHistory}, device2:{acoustics:"Silent", Time:Afternoon, commandExecutionHistory}, device3:{acoustics:"Silent", Time:Afternoon, commandExecutionHistory}}] | {userLoc:{Realworld:"R WLivingRoom", VR:"VRBedRoom2"} | {VR: {device1: "VRBedSpeaker"}, Realworld: {device1: "RWHallAC"} |

TABLE 3

| RealWorld:device Distance VR/VST: egoCentric Distance | Wake Command Time | Voice Profile | Device Selection |
|---|---|---|---|
| [VR: {device1:2m, device2:5m, deviec3:2.5m}, RealWorld: {device1:3m, device2:3.5m, device3:1m}] | 10:01pm | {UName:'Rita', userType:AllAccess} | {env: "VR", device:"HallTV"} |
| [VR: {device1:2m, device2:5m, deviec3:2.5m}, RealWorld: {device1:3m, device2:3.5m, device3:1m}] | 6:00am | {UName:'John' userType:ChildAccount} | {env: "RW", device:"RWHallSpeaker"} |
| [VR: {device1:2m, device2:5m, device3:2.5m}, RealWorld: {device1:3m, device2:3.5m, device3:1m}] | 11:50am | {UName:'Natalie', userType:AllAccess} | {env: "VR", device:"VRBedSpeaker"} |

In particular, the Deep Neural Network (DNN)-based AI model generates a recommendation for the inputs shared from the HMDA module 310. The recommendations are based on the inputs in the current scenario for the virtual world devices 217 and the real world devices 215, user preference, and context. Table 4 depicts an example of the inputs (i.e. first wakeup parameters and the second wakeup parameters) in the current scenario for the virtual world devices 217, the real world devices 215, user preference, and context.

TABLE 4

| FOV Devices | Real World Devices | SNR Value | Device State | Context | User ENV | User Directio n | device Distance | Wake Command Time | Voice Profile | Device Selection |
|---|---|---|---|---|---|---|---|---|---|---|
| {device1 :Hall TV, device2: Hall Speaker, device3: Hall TableLa mp} | {device1:B e dTV device2:Be dLamp device3:M obile} | [FOV;{devic e1:Active,de vice2:Idle,de vice3:idel}, RealWorld:{ device1:Acti ve,device2:A ctive,device3 :Idle}] | [FOV;{devic e1:Active,de vice2:Idle,de vice3:idel}, RealWorld:{ device1:Acti ve,device2:A ctive,device3 :Idle}] | [FOV;{devic e1:Active,de vice2:Idle,de vice3:idel}, RealWorld:{ device1:Acti ve,device2:A ctive,device3 :Idle}] | {user Env:" Bedro om1" } | {device 1:"Hall TV"devi ce2:"Ha llSpeake r"} | [FOV;{dev ice1:2m,de vice2:5m,d evice3:2.5 m}, RealWorld :{device1: 3m,device 2:3.5m,dev ice3:1m}] | 10:01pm | {UNam e:'John' ,userTy pe:All Access } | (env:"FO V",device: "HallTV" } |
| ... | ... | ... | ... | ... | ... | ... | ... | ... | ... | ... |
| ... | ... | ... | ... | ... | ... | ... | ... | ... | ... | ... |

The list of candidate devices includes devices predicted from the plurality of real-world devices and the plurality of virtual-world devices. Further, at block 605, the DCDS module 303 assigns, in accordance with a determined prediction function, a score to each candidate device in the list of candidate devices. The DCDS module 303 ranks each of the candidate devices based on the assigned score. The DCDS module 303 takes candidate device inputs at block 607. For example, the candidate device input gives context information such as successful execution (turning into listening mode), device state, previous preferred history (device preferences), execution history (execution of prior utterance), and error rate (device errors). These data points are fed to the model at block 605 in predicting the most appropriate device for wakeup with a higher success rate of execution. As another example, the predictive function is a contextual deep neural network that, when given normalized inputs, generates predictions with suitable scores for selecting candidates. As an example, the assigning of the device score is given in Table 5.

TABLE 5

| Device scores will be shared as below: {Y4 : 0.95, Y1: 0.76, X4:0.71, X2:0.65, ....} |
| --- |

Accordingly, the DCDS module 303, at block 611, predicts a list of devices along with the ranks of each device using the pre-trained AI model 609. the DCDS module 303 chooses top candidates by assigning scores to each of the devices according to the desired prediction function. An example of the list of devices along with the ranks of each device is given in Table 6.

TABLE 6

| Device Prediction {FOV:device1: 0.95, Realworld:device1: 0.76, Realworld:device3:0.71, FOV:device3::0.65 |
| --- |

The information about the ranks of each of the candidate devices is passed on to the HMDC module 305.

According to an embodiment, the HMDC module 305 receives the information about the ranks of each of the candidate devices from the DCDS module 303. According to another embodiment, the DCDS 303 determines the target device from the list of candidate devices having a first highest rank for waking up. The HMDC module 305 sends a wake-up signal to the target device having the highest rank. Further, the HMDC module 305 waits for the success signal of the wake signal. In case the target device does not return a success signal within a determined time frame or the target device returns an error signal then a next higher-ranked device will be selected as the target device and dispatched with the wake-up signal. The HMDC module 305 updates every successful or error transaction which is further fed to the training of DCDS module 303. This is further used in selecting and ranking the target device prediction by the DCDS module 303.

FIG. 7A illustrates a flowchart for waking up a device among a plurality of devices in a multi-reality environment, according to an embodiment of the disclosure.

Referring to FIG. 7A, according to an embodiment, the method 700 is implemented the apparatus 200 of FIG. 2. Further, the method 700 is implemented through operations 701 to 709 performed by various components of the module 205. According to some embodiments, the functions of the modules 205 may be alternately performed by the processor 201. However, for ease of understanding the operations 701 to 709 will be explained by referring to various modules 205. Further, a detailed explanation of each of the modules is covered in the above paragraphs therefore for the sake of brevity the same is being avoided here.

FIG. 7B illustrates an operational flow for waking up a device in a multi-reality environment, according to an embodiment of the disclosure. The method 700B will be explained collectively with method 700 of FIG. 7A for ease of understanding.

Referring to FIGS. 2 and 3, consider that the user 301 is in the multi-device multi-reality environment having the physical world devices 215 (e.g. device x1, device x2, device 3, device 4) and the virtual world devices 217 (e.g. device y1, device y2, device y3, and device y4) in the physical environment 103 and the XR environment 101 respectively. According to an embodiment, consider that, at block 721, the user sends a wakeup signal for example by sending the wakeup command "Hi xxx" as a voice input. As the user sends the wake-up signal x, the virtual world devices 217 and the physical world devices 215 receive the wakeup command at block 723. As the user sends the wakeup command, the PMDW module 307, and the VMDW module 309, at operation 701, detect the voice input received from the user 301. Based on the reception of the wake-up signal x, the PMDW module 307, and the VMDW module 309, at operation 703, receive the first plurality of wakeup parameters associated with the plurality of physical world devices 215 in the physical environment 103 and the second plurality of wakeup parameters associated with the plurality of virtual world devices 217 in the virtual world (e.g. XR world environment 101).

For example, the device x1, the device x2, the device x3, and the device x4 receive the wake-up command and calculate respective values for SNR, direction, processed distance, time, voice analyser values, etc., as the first wake-up parameters. The first wake-up parameters are passed to DB 207 and further given in standard format to HMDA module 310 for processing.

As a further example, the device y1, the device y2, the device y3, and the device y4 receive the wake-up command and calculate respective values such as egocentric distance, non-speech inputs including device parameters, user direction inputs, etc., as the second wake-up parameters. The second wake-up parameters are passed to DB 207 and further given in the standard format to HMDA module 310 for processing. The operations performed at operation 703 correspond to block 725.

The first plurality of wakeup parameters and the second plurality of wakeup parameters are fed to the HMDA module 310 module for pre-processing and normalizing the first plurality of wakeup parameters and the second plurality of wakeup parameters. A detailed operation of the pre-processing and normalizing of the first plurality of wakeup parameters and the second plurality of wakeup parameters is explained in the above paragraphs.

Further, at operation 705, the normalized values of the first plurality of wakeup parameters and the second plurality of wakeup parameters are fed, by the HMDA module 310, to the pre-trained artificial intelligence (AI)-based model of the DCDS module 303. Further, the HMDA module 310 also triggers a determination request to the DCDS module 303 for predicting the target device. The operation 705 corresponds to the operation at block 727. Accordingly, the DCDS module 303 at block 729 receives the first plurality of wakeup parameters, the second plurality of wakeup parameters, and the determination request from the HMDA module 310.

The pre-trained artificial intelligence (AI)-based model includes the correlation of one or more of the context of the user, the history, the device state of each of the plurality of real-world devices and the plurality of virtual-world devices, the device wakeup operation information of each of the plurality of real-world devices and the plurality of virtual-world devices, the task execution information of each of the plurality of physical world devices 215 and the plurality of virtual world devices 217 and the error information in wake-up of each of the plurality of the physical world devices 215 and the plurality of virtual-world devices 217. The training of the pre-trained artificial intelligence (AI)-based model is explained with reference to FIG. 5 above.

At operation 707, the DCDS module 303 predicts a target device based on the first plurality of wakeup parameters, and the second plurality of wakeup parameters. In an embodiment, the prediction of the target device is explained above with respect to the explanation of the DCDS module 303. Referring to FIG. 3, device y4 having the highest rank among the other virtual world devices 217 from the XR environment 101 is being selected. In an embodiment, the predicted target device may be referred to as a winner device. Further, at operation 709, the HDMC module 305 sends the wake-up signal to the target device to turn the target device into a listening state. The operation 709 corresponds to the operation in the block 731. In response to the sent wake-up signal, at block 733, if the target device is available then it sends back a success signal. According to the example embodiment, the device y4 receives the wake-up signal. If the device y4 is available, then the device y4 sends a success signal status in response to the wake-up signal and goes into a listening stage. On the other hand, if the device y4 is unavailable then an error or failure response will be sent by the device y4. In such a scenario, the device which has the next highest rank in the list of target devices will be sent with the wake-up signal. Accordingly, an appropriate device will be activated when the user is in the multi-device multi reality environment.

FIG. 8 illustrates a use case scenario for waking up a device among a plurality of devices in a multi-reality environment, according to an embodiment of the disclosure.

FIG. 8 illustrates the multi-reality environment where a user 301 is communicating with physical world devices 215 and virtual world device 217. In an example scenario consider that user 301 is in a kitchen room with multiple voice-enabled/controlled devices around in the physical world environment 103. Further, the user 301 also is in a living room in the virtual scene with multiple virtual voice-enabled/controlled devices (i.e., 801v, 803v, 805v, 301v and 200v) around in a virtual world environment 800. According to an example embodiment, the user 301 wants to give a command and hence wants to wake up one device. As an example, the kitchen room, which is the physical reality of the user includes multiple smart devices such as a family hub, smart chimney, hob, tablet, smart bulb, etc. The living room in the virtual world 800 includes multiple voice-enabled devices such as a TV, a phone, a tablet, speakers, a smart bulb, etc. Thus, as the user provides the voice input, the user's 301 wake-up command is passed to all the devices for inputs. The inputs i.e. the first wake-up parameters and the second wake-up parameters are processed by HMDA module 310. The processed and normalized inputs are then fed to the DCDS module 303 for prediction. The DCDS module 303 further predicts the target device having the highest rank. Further, the HMDE module 305 sends the wake-up signal to the target device to turn it into listening mode. In the example scenario consider that TV of the virtual world is being selected as the target device. In particular, the DCDS module 303 is based on multiple factors such as signal-to-noise ratio at each device, non-speech inputs including normalized device parameters from both the physical and virtual reality environments such as user direction, user distance from the device, time factor, voice analyser inputs, egocentric distance, etc., predicts the TV display in the virtual world as the higher ranked. Thus, the wake-up signal is dispatched to the same by the HMDE module 305. According to some embodiments, the HMDA module 310, DCDS module 303, and the HMDE module 305 are collectively referred to as a contextual device selection engine.

FIG. 9 illustrates another case scenario for waking up a device among a plurality of devices in a multi-reality environment, according to an embodiment of the disclosure.

FIG. 9 illustrates the multi-reality environment where a user 301 is communicating with physical world devices 215 and virtual world device 217. In an example, a scenario considers that the user 301 is in a living room with multiple voice-enabled/controlled devices around in the physical environment 103. The user 301 is in the virtual scene bedroom with multiple virtual voice-enabled/controlled devices around in the virtual environment 800. The user is not static and moving around in the virtual space. The user 301 wants to give the command and hence wants to wake up one device. As an example, the living room, which is the physical reality of the user 301 includes multiple voice-enabled devices such as TV, Phone, tablet, speaker, smart bulb, etc. Further, the bedroom, which is the virtual scene of the user 301 includes multiple smart devices such as smart TV, smart Bulb, etc. Thus, as the user provides the voice input, the user's 301 wake-up command is passed to all the devices for inputs. Further, the inputs i.e. the first wake-up parameters and the second wake-up parameters are processed by HMDA module 310. The processed and normalized inputs are then fed to the DCDS module 303 for prediction. The DCDS module 303 further predicts the target device having the highest rank. The HMDE module 305 sends the wake-up signal to the target device to turn it into listening mode. In the example scenario consider that TV 901 of the virtual world is being selected as the target device. In particular, the DCDS module 303 is based on multiple factors such as signal-to-noise ratio at each device, non-speech inputs including normalized device parameters from both the physical and virtual reality environments such as user direction, user distance from the device, time factor, voice analyser inputs, egocentric distance, etc., predicts the TV display 901 in the virtual environment 800 as the higher ranked. The wake-up signal is dispatched to the same by the HMDE module 305. According to some embodiments, the HMDA module 310, DCDS module 303, and the HMDE module 305 are collectively referred to as a contextual device selection engine.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Certain elements may be split into multiple functional elements. Elements from one embodiment may be added to another embodiment. For example, orders of processes described herein may be changed and are not limited to the manner described herein. The actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for waking up a device among a plurality of devices in a multi-reality environment, the method comprising:

detecting a voice input from a user;

receiving, based on the voice input, a first plurality of wakeup parameters associated with a plurality of real-world devices in the real-world and a second plurality of wakeup parameters associated with a plurality of virtual-world devices in a virtual world;

feeding the first plurality of wakeup parameters and the second plurality of wakeup parameters into a pre-trained artificial intelligence (AI)-based model including:

a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices, and error information in wake-up of each of the plurality of real-world devices and the plurality of virtual-world devices;

predicting, by the pre-trained AI-based model, a target device based on the first plurality of wakeup parameters, the second plurality of wakeup parameters; and sending a wake-up signal to the target device for turning the target device into a listening state.

2. The method of claim 1, wherein the first plurality of wakeup parameters comprises at least one of:

a signal to noise ratio (SNR) value of each of the plurality of real-world devices;

user's environmental information;

a current state of each of the plurality of real-world devices;

18 a first device status of each of the plurality of real-world devices;

a first device context of each of the plurality of real-world devices;

a direction of the voice input of the user;

a distance of the user from each of the plurality of real-world devices;

user's location information;

a voice profile information;

user profile information; or time information related to usage of the each of the plurality of real-world devices.

3. The method of claim 1, wherein the second plurality of wakeup parameters comprises at least one of:

a second device state of each of the plurality of virtual-world devices;

a second device context of each of the plurality of virtual-world devices;

an egocentric distance between the user and each of the plurality of virtual-world devices;

user profile information;

time information related to usage of the each of the plurality of virtual-world devices; or a normalized signal to noise ratio (SNR) value of each of the plurality of virtual-world devices.

4. The method of claim 1, further comprising:

pre-processing the first plurality of wakeup parameters and the second plurality of wakeup parameters by performing a plurality of operations; and normalizing the first plurality of wakeup parameters and the second plurality of wakeup parameters based on the pre-processing, wherein the normalized first plurality of wakeup parameters and the normalized second plurality of wakeup parameters are fed into the pre-trained AI-based model.

5. The method of claim 1, wherein the predicting of the target device comprises:

predicting, by the pre-trained AI-based model, a list of candidate devices, from the plurality of real-world devices and the plurality of virtual-world devices, wherein the list of candidate devices includes devices predicted from the plurality of real-world devices and the plurality of virtual-world devices, assigning, in accordance with a determined prediction function, a score to each candidate device in the list of candidate devices by the pre-trained AI-based model, ranking each of the candidate devices based on the assigned score by the pre-trained AI-based model, and determining the target device from the list of candidate devices having a first highest rank for waking-up.

6. The method of claim 5, further comprising:

determining an availability of the target device based on the first plurality of wakeup parameters and the second plurality of wakeup parameters; and sending the wake-up signal to the target device for turning the target device in the listening state based on the determination of the availability of the target device.

7. The method of claim 6, wherein, based on the determination of unavailability of the target device, the method further comprises:

determining a next target device from the list of candidate devices having a second highest rank for waking-up; and sending the wake-up signal to the next target device for turning the next target device in the listening state based on a result of the determination.

8. An apparatus for waking up a device among a plurality of devices in a multi-reality environment, the apparatus comprising:

memory storing one or more computer programs; and one or more processors communicatively coupled to the memory, wherein the one or more computer programs include computer-executable instructions that, when executed by the one or more processors, cause the apparatus to:

detect a voice input from a user;

receive, based on the voice input, a first plurality of wakeup parameters associated with a plurality of real-world devices in the real-world and a second plurality of wakeup parameters associated with a plurality of virtual-world devices in a virtual world;

feed the first plurality of wakeup parameters and the second plurality of wakeup parameters into a pre-trained artificial intelligence (AI)-based model including:

a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices, and an error information in wake-up of each of the plurality of real-world devices and the plurality of virtual-world devices;

predict, by the pre-trained AI-based model, a target device based on the first plurality of wakeup parameters, the second plurality of wakeup parameters; and send a wake-up signal to the target device for turning the target device into a listening state.

9. The apparatus of claim 8, wherein the first plurality of wakeup parameters comprises at least one of:

a signal to noise ratio (SNR) value of each of the plurality of real-world devices, user's environmental information;

a current state of each of the plurality of real-world devices, a first device status of each of the plurality of real-world devices;

a first device context of each of the plurality of real-world devices, a direction of the voice input of the user;

a distance of the user from each of the plurality of real-world devices;

user's location information;

a voice profile information;

user profile information; or time information related to usage of the each of the plurality of real-world devices.

10. The apparatus of claim 8, wherein the second plurality of wakeup parameters comprises at least one of:

a second device state of each of the plurality of virtual-world devices;

a second device context of each of the plurality of virtual-world devices;

an egocentric distance between the user and each of the plurality of virtual-world devices;

user profile information;

time information related to usage of the each of the plurality of virtual-world devices; or a normalized signal to noise ratio (SNR) value of each of the plurality of virtual-world devices.

11. The apparatus of claim 8, wherein the one or more computer programs further include computer-executable instructions that, when executed by the one or more processors, cause the apparatus to:

pre-process the first plurality of wakeup parameters and the second plurality of wakeup parameters by performing a plurality of operations, and normalize the first plurality of wakeup parameters and the second plurality of wakeup parameters based on the pre-processing, and wherein the normalized first plurality of wakeup parameters and the normalized second plurality of wakeup parameters are fed into the pre-trained AI-based model.

12. The apparatus of claim 8, wherein, to predict the target device, the one or more computer programs further include computer-executable instructions that, when executed by the one or more processors, cause the apparatus to:

predict, by the pre-trained AI-based model, a list of candidate devices, from the plurality of real-world devices and the plurality of virtual-world devices, wherein the list of candidate devices includes devices predicted from the plurality of real-world devices and the plurality of virtual-world devices, assign, in accordance with a determined prediction function, a score to each candidate device in the list of candidate devices by the pre-trained AI-based model, rank each of the candidate devices based on the assigned score by the pre-trained AI-based model, and determine the target device from the list of candidate devices having a first highest rank for waking-up.

13. The apparatus of claim 12, wherein the one or more computer programs further include computer-executable instructions that, when executed by the one or more processors, cause the apparatus to:

determine an availability of the target device based on the first plurality of wakeup parameters and the second plurality of wakeup parameters, and send the wake-up signal to the target device for turning the target device in the listening state based on the determination of the availability of the target device.

14. The apparatus of claim 13, wherein, based on the determination of unavailability of the target device, the one or more computer programs further include computer-executable instructions that, when executed by the one or more processors, cause the apparatus to:

determine a next target device from the list of candidate devices having a second highest rank for waking-up, and send the wake-up signal to the next target device for turning the next target device in the listening state based on a result of the determination.

15. The apparatus of claim 8, wherein input samples for the pre-trained AI-based model comprise a context of the user, a history, a device state of each of a plurality of physical world devices and a plurality of virtual world devices, task execution information of each of the plurality of physical world devices and the plurality of virtual world devices, and error information in wake-up of each of the plurality of the physical world devices and the plurality of virtual-world devices.

16. The apparatus of claim 15, wherein the pre-trained AI-based model is trained on the input samples.

17. The apparatus of claim 15, wherein the pre-trained AI-based model includes correlation information between the one or more of the context of the user, the history, the device state of each of the plurality of physical world devices and the plurality of virtual world devices, the task execution information of each of the plurality of physical world devices and the plurality of virtual world devices, and the error information in wake-up of each of the plurality of the physical world devices and the plurality of virtual-world devices.

18. The apparatus of claim 17, wherein the correlation information determines an inference stage for predicting a target device.

19. One or more non-transitory computer-readable storage media storing one or more computer programs including computer-executable instructions that, when executed by one or more processors of an apparatus, cause the apparatus to perform operations, the operations comprising:

detecting a voice input from a user;

receiving, based on the voice input, a first plurality of wakeup parameters associated with a plurality of real-world devices in the real-world and a second plurality of wakeup parameters associated with a plurality of virtual-world devices in a virtual world;

feeding the first plurality of wakeup parameters and the second plurality of wakeup parameters into a pre-trained artificial intelligence (AI)-based model including:

a correlation of one or more of a context of the user, a history, a device state of each of the plurality of real-world devices and the plurality of virtual-world devices, a device wakeup operation information of each of the plurality of real-world devices and the plurality of virtual-world devices, a task execution information of each of the plurality of real-world devices and the plurality of virtual-world devices, and error information in wake-up of each of the plurality of real-world devices and the plurality of virtual-world devices;

predicting, by the pre-trained AI-based model, a target device based on the first plurality of wakeup parameters, the second plurality of wakeup parameters; and sending a wake-up signal to the target device for turning the target device into a listening state.

20. The one or more non-transitory computer-readable storage media of claim 19, wherein the first plurality of wakeup parameters comprises at least one of:

a signal to noise ratio (SNR) value of each of the plurality of real-world devices;

user's environmental information;

a current state of each of the plurality of real-world devices;

a first device status of each of the plurality of real-world devices;

a first device context of each of the plurality of real-world devices;

a direction of the voice input of the user, a distance of the user from each of the plurality of real-world devices;

user's location information;

a voice profile information;

user profile information; or time information related to usage of the each of the plurality of real-world devices.

* * * * *